Sept. 11, 1928. 1,683,650
G. A. BOETTCHER
MECHANICAL MOVEMENT AND REGULATING DEVICE
Filed March 20, 1926 4 Sheets-Sheet 1

Inventor
Gustav A. Boettcher

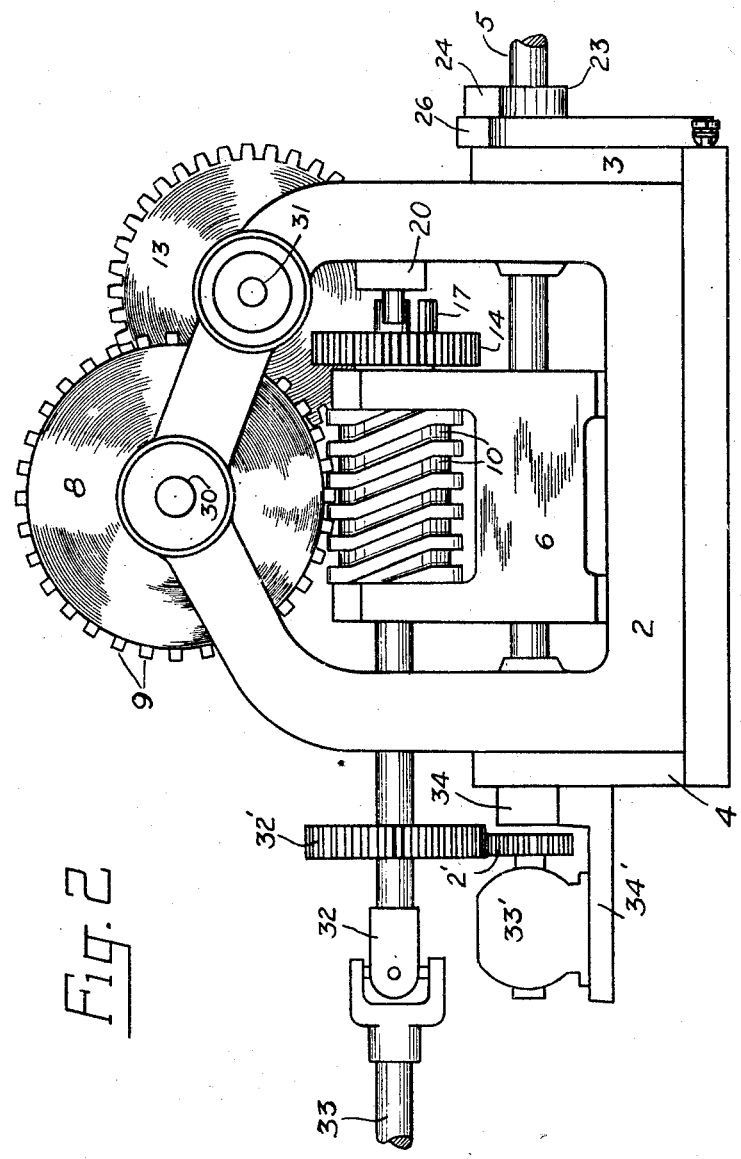

Sept. 11, 1928.
G. A. BOETTCHER
1,683,650
MECHANICAL MOVEMENT AND REGULATING DEVICE
Filed March 20, 1926   4 Sheets-Sheet 3
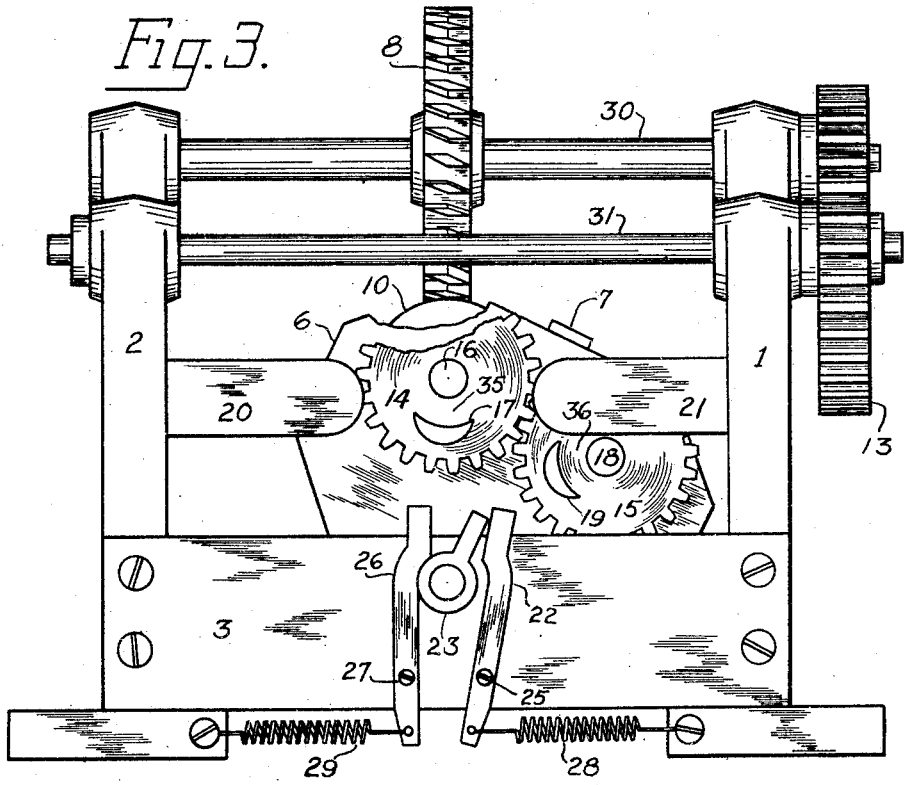
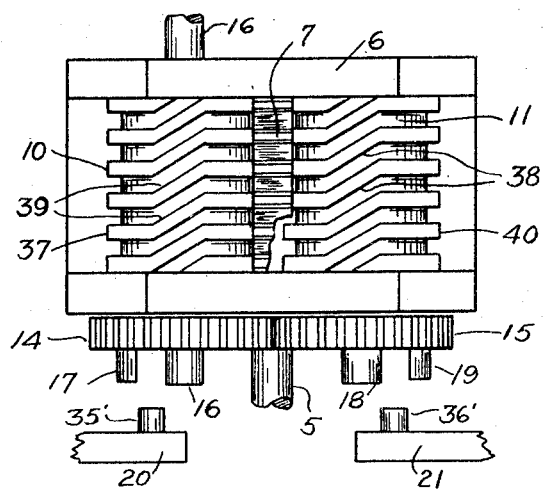
Inventor
Gustav A. Boettcher Sept. 11, 1928.

G. A. BOETTCHER

MECHANICAL MOVEMENT AND REGULATING DEVICE

Filed March 20, 1926  4 Sheets-Sheet 4

1,683,650

INVENTOR
Gustav A. Boettcher.

Patented Sept. 11, 1928.

1,683,650

UNITED STATES PATENT OFFICE.

GUSTAV A. BOETTCHER, OF JAMAICA, NEW YORK, ASSIGNOR TO MULTI-NEEDLE ENGINEERING CORPORATION, OF JAMAICA, NEW YORK.

MECHANICAL MOVEMENT AND REGULATING DEVICE.

Application filed March 20, 1926. Serial No. 96,353.

This invention relates to mechanical movements and regulating apparatus, and particularly to the class wherein a shiftable gear carriage or cradle is adapted to be moved to throw rotary members mounted therein into or out of mesh with a gear mounted in spaced relation to said carriage.

The main object of my invention is to provide a reliable mechanical device of the character mentioned which is adapted for use as a valve regulator in gas and oil burning apparatus and systems, and also in refrigeration apparatus and compressed air and vacuum lines.

Another object is to provide a device of this character which may be driven continuously in one direction while being shiftable to deliver rotation in the same or in the opposite direction.

A further object is to provide an apparatus which may be shiftable to deliver rotary movement in one direction at one shift position of the members thereof, and movement in the opposite direction or at a different speed in another shift position while having the delivery shaft locked rigid in an intermediate shift position.

Yet another object is to provide in combination with an apparatus of this character a shifting means especially adapted for use to shift said device into its various useful positions.

Other objects and the adaptability and advantages of the invention will presently appear in the specification.

In the accompanying drawings:—

Fig. 2 is a side view of the whole apparatus including the shifting means and presenting the whole as an operative unit.

Fig. 3 is a front end view of Fig. 1.

Fig. 4 is a plan view of the gear carriage of the previous views.

Throughout the views, the same reference numerals indicate the same or duplicate parts.

Figure 1:
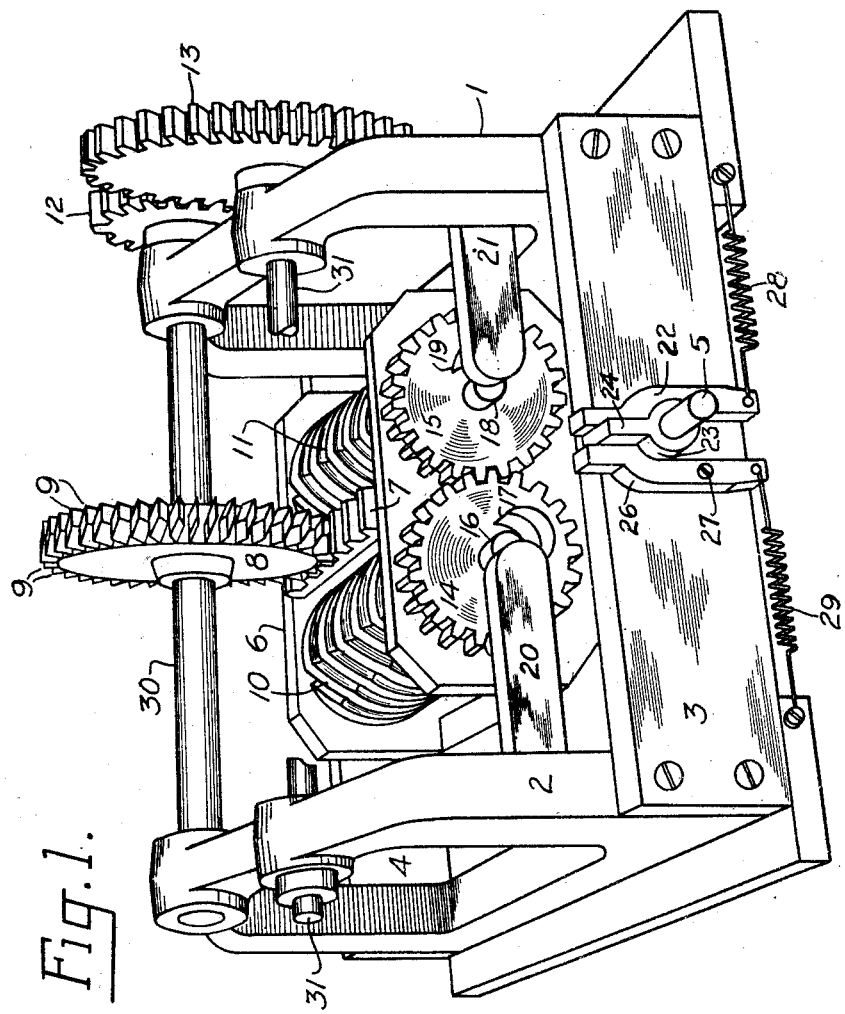
Fig. 1 is a view of an apparatus embodying the main features of my invention, the shifting means having been omitted to clarify the view.

In rotary regulating devices of various descriptions used for governing valves, oil feed and the like, it is usual to have provision for adjustment in either direction, but all means for locking the movable members in a neutral position are ordinarily lacking. This makes for inaccuracy and accidental shifting of adjustments, thereby introducing a definite element of danger and loss.

In view of this and the objects hereinbefore mentioned, it is now proposed to construct a device which positively drives in either direction, and holds the attained position with equal certainty in neutral adjustment position.

In the practise of my invention, a pair of corresponding frames 1 and 2 are secured together by a pair of similar plates 3 and 4. A shaft 5 is rotatably mounted in these plates and a rocking member or carriage 6 is fixed on the shaft 5, while providing bearings in its upper portion for a pair of shafts 16 and 18. These shafts are each provided with a rotary step rack 10 and 11, respectively, and upon their forward extremities with gears 14 and 15 which mesh with each other, and will therefore cause opposite movements of the shafts and rotary racks. The carriage is provided with a bridge between the racks which has an ordinary rack 7 cut therein of the same pitch as the rotary members.

A transverse shaft 30 is mounted in the upper portions of frames 1 and 2 and a gear 8 is mounted on the shaft and adapted to mesh with rack 7. If the carriage should be rocked to either side so that the rotary member 10 or member 11 should be directly beneath gear 8, the latter would mesh with the member beneath it. But in order to provide the intermediate central position as the normal neutral and locked position, a hub stop 23 is secured to shaft 5 and is further provided with a vertical stop projection 24.

Figure 5:
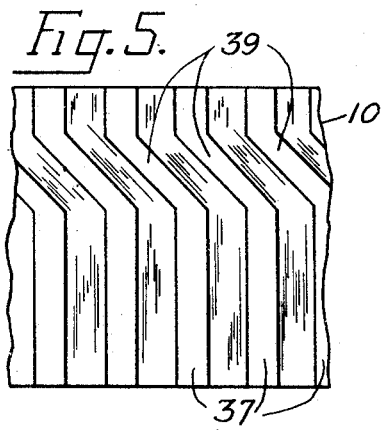
Fig. 5 is graphic view of the teeth of the rotary rack member 10 of the former view.
Figure 8:
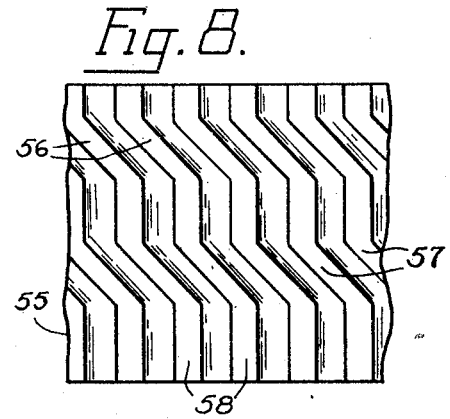
Fig. 8 is a modification of Fig. 5.
Figure 6:
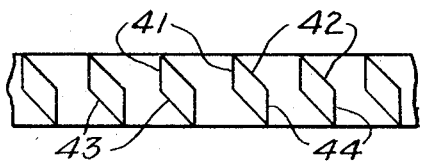
Fig. 6 is a graphic view of the teeth of the gear 8 of the first views, showing the special form of the teeth.
Figure 9:
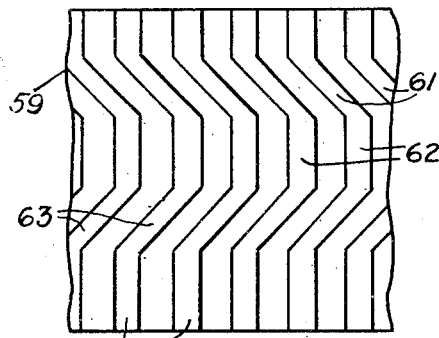
Fig. 9 is a modification of Figs. 5 and 8.
Figure 7:
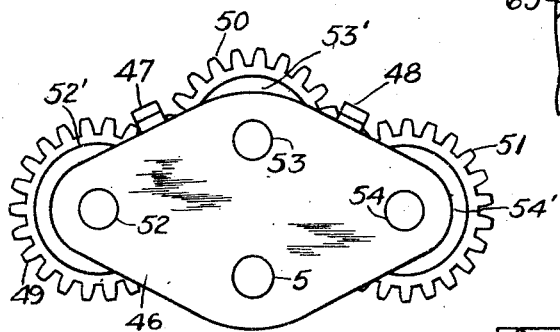
Fig. 7 is a rear end view of a modification of the carriage shown in Fig. 4.
Figure 10:
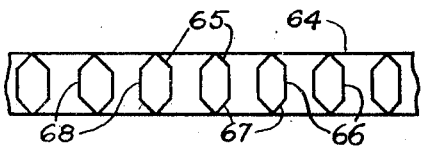
Fig. 10 is a rack or gear chart of teeth adapted to mesh with the teeth of Fig. 10, and is a modification of the Fig. 6.

Furthermore, a pair of similar and oppositely disposed stop fingers 22 and 26 are pivoted to plate 3 at 25 and 27, and are caused to bear normally against the hub stop 23 by means of a pair of tension springs 28 and 29 which are attached to the lower extremities of the fingers and to frames 1 and 2. If the shaft 5 is partly rotated clockwise by any suitable means, the stop projection 24 will force the upper portion of finger 22 away from the hub 23 against the resistance of spring 28. The latter tends to force or move part 24 and thereby the whole carriage back to central position as soon as released. The other finger 26, on the other hand does not move to follow 24 toward the right because it is so formed that in normal position it engages the hub simultaneously with the stop 24. This condition is also normally true of finger 22. Hence, the hub acts as a permanent stop or limit for the fingers, and the latter, thus limited, and by virtue of the tension of their springs will tend to hold the projection 24 in a central position, and thereby the carriage in normal neutral position. Returning to the clockwise movement of shaft 5 as seen in Fig. 3, the gear 8 is here in mesh with step rack 10. The teeth 37 are exactly at a right angle to the shaft except at one point along the rack, and there the diagonal steps at 39 suddenly turn each one of the teeth up one step to the next above. In similar fashion, the teeth 40 in rack 11 are stepped up one space each by diagonal steps at 38, the racks 10 and 11 being identical in this respect. Fig. 5 shows the teeth laid out in chart form of the entire periphery of one of the racks and clearly illustrates this point. But now, in order to have a spur gear mesh properly with the teeth 37 in rack 10, its teeth 9—9 must be practically diamond shaped. The teeth may be turned to provide transverse faces 41 and 44 to contact with the straight sides of the rack teeth, and will then have the diagonal faces 43 and 42 to contact with the diagonal teeth at 39. In the sixth view this is pointed out in chart form.

The effect of this form of rotary step rack is to cause a movement of one tooth ahead on gear 8 for each revolution of the rack. And, whereas racks 10 and 11 are identical in form, even to the same direction of bias on the diagonal steps, yet, owing to the fact that they are adapted to revolve in opposite directions when in motion, rack 10 will step the gear 8 ahead or forward, while the rack 11 will step it backward. Of course, in the intermediate position, when the gear meshes with the stationary rack 7, it is locked against rotation and no movement is possible.

It is clear that any means now known for shifting gears or analogous devices to this invention may be used for this purpose with my device without departing from the invention.

Now, in order to communicate the movement of the external drive shaft 33 which is rotated by a motor or any other suitable means to the device, a universal joint 32 is connected to said shaft and to the rear extremity of shaft 16, thus allowing the carriage to shift. The shaft 16 may thus rotate at all times, and likewise shaft 18, the shifting of the carriage to one side causing the gear 8 to mesh with rack 10 and if shifted to the other side will mesh the same gear with rack 11. By this means the gear will be rotated tooth by tooth in either direction. At each such movement, a long pause follows because the relative length of the straight rack teeth is great compared with the bias steps and furthermore provides opportunities for shifting the carriage to neutral position or to the other side. In this connection it may be well to mention that rack 7 has its teeth placed directly in line with those of the rotary racks, although the diagonal steps may not be used as shifting points or contacts. Therefore, to avoid shifting at such positions, the gear 14 is provided with a crescent cam 17 and also the projecting free extremity of the shaft 16. In conformity with this structure, a projecting lug 20 is secured to frame 2 and is provided with a stud 35′ which is adapted to pass through a slot 35 on gear 14. The location of this cam 17 relative to the steps at 39 on the rack 10 is such that when the steps in rotation approach the teeth of gear 8, then the cam approaches stud 35′ to prevent contact between 8 and 10 by shift of the carriage until the steps have passed. On the other hand, if the gear 8 is actually in mesh with rack 10 before the diagonal steps approach the gear, then the cam will catch the stud 35′ in the channel 35 and will hold the stud in position and thereby the carriage until the steps have been passed, and have imparted movement to the gear. The same principle applies in similar manner to cam 19 on gear 15, for the stud 36′ is here adapted to ride in the channel 36 or outside the cam.

In some cases, the relative movement of shaft 30 may be too rapid in comparison with drive shaft 33, and this is remedied by introducing a second transverse shaft 31 which is supported by frames 1 and 2 and bears a large spur gear 13 on its extremity. A pinion 12 is secured upon the adjacent extremity of shaft 30 and meshes with gear 13, and when the apparatus is in active operation, the gradual rotation of shaft 31 is the final result, as the stepping action of gear 8 is then reduced and refined by this geared reduction. The direction of rotation is under immediate control, and when no longer desired, the neutral position automatically holds the gain made.

In the eighth view, the rack teeth 58 in the chart 55 have two stages of bias steps at 56 and 57. But in the ninth view, the chart 59 has its teeth 60 broken by a stage of bias steps at 61, straight teeth 62, and again by bias steps in return position at 63. This reversal of the angles requires in the gear that should mesh with the stepped teeth that its teeth be formed at 68 on chart 64 to contact properly with all the faces thus formed. The transverse faces 66 are adapted to engage the straight teeth, faces 65 to engage one bias stage, while the other diagonal faces 67 are adapted to engage the return bias steps on the chart gear.

Manifestly, instead of the present gear carriage 6 which provides for two opposite directions of movement, a different and broader carriage 46 may be used. This carriage has three shafts 52, 53 and 54 which have secured thereon the rotary members or gears 49, 50 and 51, respectively. These members are all in mesh in series, while on their shafts may be mounted rotary step racks similar to 10, or worms at 52', 53' and 54', while they may also be of different diameters to produce different speeds and directions of rotation. The gears 49, 50 and 51 may also be of different diameters to produce different rotational speeds for their shafts. The stationary racks 47 and 48 may serve as intermediate stops for the gear adapted to mesh with the rotary members 52', 53' and 54'. The carriage may in some forms of my device be furnished with a larger number of rotary members so that the carriage itself becomes practically a drum with shiftable rotating members all around it, the members being similar or different to produce various, similar or opposite effects and speeds of rotation as a result.

Having now fully described my invention, I claim:—

1. A regulating device comprising a frame, a pivot shaft mounted in the frame and a carriage secured upon said shaft within said frame, a pair of shafts mounted in said carriage and provided each with a gear in mesh with the other, a rotary toothed member also mounted on each of said pair of shafts, and a transverse shaft mounted upon said frame having a gear secured thereon adapted to mesh with either of said rotary toothed members in different positions of said carriage.

2. A regulating device comprising a frame, a pivot shaft mounted in said frame and a carriage upon said pivot shaft, a series of substantially similar shafts mounted on said carriage and provided each with a gear meshing with the others to provide simultaneous rotation of all said shafts, rotary toothed members secured upon said carriage shafts and means to rotate said shafts, said rotary toothed members being designed to provide various rotational effects, and a delivery shaft mounted upon said frame and provided with a gear adapted to mesh individually with any one of said rotary toothed members in various positions of said carriage.

3. A regulating device comprising a frame, a pivot shaft in said frame, a carriage on said shaft, a second shaft mounted on said carriage bearing a rotary toothed member, means to rotate said second shaft, a stationary rack upon said carriage besides said rotary member, a third shaft mounted upon said frame provided with a gear adapted to mesh with either said rack or said rotary member and means to shift said carriage to mesh either said rack or said rotary member with said gear.

4. A regulating device comprising a frame, a rocking carriage mounted in said frame having a pair of shafts therein, gears mounted on said shafts in mesh with each other, exterior means to rotate said shafts, a pair of similar rotary members mounted on said shafts having peripheral teeth substantially in line with the direction of rotation of the members and broken by a series of similar diagonal steps connecting each tooth with the next above, a delivery shaft on said frame and a gear on said shaft adapted to mesh with either of said rotary members and means to shift said carriage to mesh one or the other of said members with said gear.

5. A mechanical movement comprising a frame, a pivot shaft, a rocking carriage mounted on said shaft, a pair of shafts mounted in said carriage, gears upon the extremities thereof in mesh with each other and intermediate the extremities a pair of rotary members having each a series of teeth parallel with the periphery of the member with a series of diagonal steps connecting each tooth with one adjacent thereto, a stationary rack mounted upon said carriage between said rotary members, a delivery shaft mounted upon aforesaid frame and a gear upon said shaft adapted to mesh with said members and said rack individually upon shifting of said carriage to meshing positions and means to shift said carriage.

6. A mechanical device comprising a frame, a pivot shaft movably mounted therein, a carriage secured within the frame upon said shaft provided with a pair of shafts geared together, a rear motor shelf upon said pivot shaft exterior to said frame adapted to shift in unison with said carriage, a motor being mounted on the shelf and connected to one of said pair of carriage borne shafts, means to shift said carriage and shelf, and a delivery shaft secured to said frame having a gear mounted thereon adapted to mesh with rotary members on said shafts.

7. A mechanical movement comprising a frame, a pivot shaft mounted therein and a rocking carriage secured on said shaft within the frame, means to normally hold said carriage and the pivot shaft in intermediate neutral position comprising a collar on said shaft having a radial projection and a pair of fingers pivoted to said frame on either side of said collar and formed to partly envelop the same and having projections adapted to lie along said radial collar projection, and means to hold said fingers against said collar including a spring secured to each of said fingers and to said frame.

8. In a mechanical device including a frame and a shaft mounted therein, a carriage mounted on the shaft including a pair of end walls, an enveloping wall connecting the bottom edges of said end walls and part of the side edges thereof, bearings on one end wall and corresponding bearings on the other end wall and a straight bridge member connecting said end walls between said bearings.

9. In a mechanical movement, a frame having a pivot shaft, a rocking carriage mounted thereon, a second shaft on said carriage having a rotary member, and a cam on said shaft, means to shift said carriage and means to rotate said second shaft, and a contact member upon said frame adapted to obstruct said cam to move the same to one side or the other of said projection in one position of said second shaft when in motion to restrict shifting of said carriage until the cam has passed said obstructive projection.

10. In a mechanical device a frame having a pivot shaft mounted therein, a carriage mounted on said shaft and provided with a shaft thereon, a rotary member thereon having a series of similar teeth parallel with the periphery of the member broken by diagonal steps connecting each tooth with the next and arranged in a row parallel with the axis of the member, a gear mounted on said frame adapted to mesh with said rotary member, and means to prevent movement of said carriage when said diagonal steps pass said gear comprising a cam mounted upon one extremity of said carriage borne shaft and a projection upon said frame adapted to pass on either side of said cam upon rotation of said rotary member.

11. A mechanical device comprising a frame having a pivot shaft mounted therein, a carriage secured upon said shaft within the frame and bearing a pair of shafts, a pair of gears on said shafts in mesh with each other, rotary members upon said shafts having generally straight transverse teeth connected to each other by diagonal steps, a gear adapted to mesh with said members individually when the carriage is shifted to a position therefor, and means to prevent all movement of said carriage when said diagonal steps in rotation pass said gear including a cam on each of said pair of meshing gears and a pair of corresponding projections upon said frame adapted to pass within or outside said cams during rotation of said members.

12. In a mechanical device having a frame, a pivot shaft located thereon, a rocking member secured to said shaft, a transverse shaft upon said frame and a gear mounted on said second shaft in a plane parallel with said first shaft, and a rack mounted on said rocking member adapted to be swung into engagement with said gear to brake the same, and to be swung out of engagement with the gear to release the same.

13. In a mechanical device including a frame, a pivot shaft mounted in said frame and a carriage secured upon said shaft comprising a body portion, a pair of forward and rear bearings upon the respective forward and rear extremities of the carriage, and a rack connecting said forward bearings with said rear bearings located between said bearings and parallel with the pivot shaft.

14. In a mechanical device having a frame, a pivot shaft and a carriage mounted thereon comprising a carriage body, a pair of adjacent bearings secured upon one extremity of the body, a pair of corresponding bearings secured upon the other extremity of the body, a bridge bearing a rack located between said first pair and said second pair of bearings to connect both pairs and arranged parallel relative to the aforesaid pivot shaft.

15. A mechanical device comprising a frame, a pivot shaft in said frame, a carriage upon said pivot shaft bearing a rotary member, means to rotate said carriage borne shaft and member, an intermediate delivery shaft mounted upon said frame having a gear secured thereon adapted to mesh with said rotary member, a pinion on said intermediate shaft, a final delivery shaft also mounted on said frame with a gear mounted thereon in mesh with said pinion, and means to swing said carriage to throw said rotary member into or out of mesh with said first gear.

In testimony whereof, I, GUSTAV A. BOETTCHER have signed my name to this specification, this seventeenth day of March, 1926.

GUSTAV A. BOETTCHER.